United States Patent
Sivertsen

(10) Patent No.: US 7,096,300 B2
(45) Date of Patent: *Aug. 22, 2006

(54) METHOD AND APPARATUS FOR SUSPENDING COMMUNICATION WITH A HARD DISK DRIVE IN ORDER TO TRANSFER DATA RELATING TO THE HARD DISK DRIVE

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 453 days.

This patent is subject to a terminal disclaimer.

(21) Appl. No.: 10/143,614

(22) Filed: May 10, 2002

(65) Prior Publication Data

US 2003/0046461 A1    Mar. 6, 2003

Related U.S. Application Data

(63) Continuation-in-part of application No. 09/944,797, filed on Aug. 31, 2001.

(51) Int. Cl.
*G06F 13/14* (2006.01)

(52) U.S. Cl. .................. 710/305; 711/114; 710/302
(58) Field of Classification Search ........ 710/300–304, 710/104, 100; 711/114; 714/5
See application file for complete search history.

(56) References Cited

U.S. PATENT DOCUMENTS

| | | | | |
|---|---|---|---|---|
| 5,313,626 A | * | 5/1994 | Jones et al. ............... | 714/5 |
| 5,317,697 A | | 5/1994 | Husak et al. .............. | 710/302 |
| 5,579,491 A | | 11/1996 | Jeffries et al. ............ | 710/302 |
| 5,666,497 A | * | 9/1997 | Milhaupt et al. ........... | 710/305 |
| 5,787,246 A | | 7/1998 | Lichtman et al. ........... | 709/220 |
| 5,815,647 A | | 9/1998 | Buckland et al. ........... | 714/3 |
| 5,822,782 A | * | 10/1998 | Humlicek et al. ........... | 711/170 |
| 5,867,733 A | | 2/1999 | Meyer | |
| 5,898,891 A | | 4/1999 | Meyer | |
| 5,920,709 A | | 7/1999 | Hartung et al. ............ | 710/305 |
| 6,038,624 A | * | 3/2000 | Chan et al. ............... | 710/302 |

(Continued)

OTHER PUBLICATIONS

Conner Peripherals, Inc. and Intel Corporation, *SCSI Accessed Fault-Tolerant Enclosures Interface Specification*, Revision 1.00, Oct. 17, 1995.

(Continued)

*Primary Examiner*—Paul R. Myers
*Assistant Examiner*—Clifford Knoll
(74) *Attorney, Agent, or Firm*—Hope Baldauff Hartman, LLC

(57) ABSTRACT

Methods and apparatus are provided for suspending communications with a hard disk drive in order to transfer data relating to the hard disk drive between the host and an intermediate communications gateway, thereby isolating the hard disk drive from the bus while this data is transferred. The data transferred between the host and the intermediate communications gateway may include control signals transferred from the host to the intermediate communications gateway and status signals transferred from the intermediate communications gateway to the host. In one embodiment, normal communications with an IDE hard disk drive are suspended upon the assertion of the reset line of the AT bus. As such, the state of the reset line may be controlled such that the reset line is no longer merely utilized as a system reset but, instead, is used to define the state of communications between the host and the hard disk drive.

26 Claims, 8 Drawing Sheets

U.S. PATENT DOCUMENTS

| | | | |
|---|---|---|---|
| 6,070,207 A | 5/2000 | Bell | 710/302 |
| 6,145,029 A | 11/2000 | Deschepper et al. | 710/36 |
| 6,516,374 B1 | 2/2003 | Kinoshita et al. | 710/304 |
| 6,594,721 B1 | 7/2003 | Sakarda et al. | 710/304 |
| 6,639,792 B1 | 10/2003 | Chang | 361/685 |
| 6,654,842 B1 | 11/2003 | Park | 710/302 |
| 6,654,843 B1 | 11/2003 | Wakeley et al. | 710/302 |
| 6,742,068 B1 | 5/2004 | Gallagher et al. | 710/302 |
| 6,743,054 B1 | 6/2004 | Wu | 439/638 |

OTHER PUBLICATIONS

David Landis and William Check, "An Analysis of Queuing Strategies for SCA Data Broadcast Systems," 1988, The Pennsylvania State University, IEEE Transactions On Broadcasting, vol. 34, No. 1, Mar. 1998.

Addonics Technologies, "Addonics IDE to SCSI Model: ADAEC7726H", http://www.addonics.com.

Winchester Electronics, "SCA-2 Single Connector Attachment", http://www.winchesterelectronics.com/products.sca2/sca2.asp.

* cited by examiner

METHOD AND APPARATUS FOR SUSPENDING COMMUNICATION WITH A HARD DISK DRIVE IN ORDER TO TRANSFER DATA RELATING TO THE HARD DISK DRIVE

RELATED APPLICATIONS

This application is a continuation-in-part of U.S. Pat. No. 7,007,109, entitled METHOD AND APPARATUS FOR SUSPENDING COMMUNICATION WITH A HARD DISK DRIVE IN ORDER TO TRANSFER DATA RELATING TO THE HARD DISK DRIVE, issued on Feb. 28, 2006.

FIELD OF THE INVENTION

The present invention relates generally to methods and apparatus for suspending communication with a hard disk drive in order to transfer data relating to the hard disk drive and, more particularly, methods and apparatus for isolating a hard disk drive from a communication bus in order to transfer status and/or control signals relating to the hard disk drive.

BACKGROUND OF THE PRESENT INVENTION

A variety of intelligent hard disk drives have been developed, such as intelligent drive electronics (IDE) hard disk drives, small computer systems interface (SCSI) hard disk drives and fiber channel (FC) hard disk drives. In addition to the hard disk and associated drive electronics, an intelligent hard disk drive includes an integral controller designed specifically for the particular type of hard disk drive in order to control its operation.

In a computer, such as a personal computer, a hard disk drive is connected to the central processing unit by means of the system bus. In this regard, conventional computer architectures have a motherboard that includes a central processing unit and the system bus to which various peripherals, including a hard disk drive, are connected. To support the connection of the various peripherals, including a hard disk drive, to the system bus, a motherboard also generally includes a number of bus slots. A hard disk drive is typically connected to a respective bus slot by means of another bus designed specifically to support communications between the system bus and the hard disk drive. With respect to an IDE hard disk drive, for example, the IDE hard disk drive is connected to the respective bus slot by means of an advanced technology (AT) bus. An AT bus is a flat cable having 40 lines, each designed to support communication of a predetermined type of signal. For example, an AT bus includes a number of address lines, data lines, chip select lines, a reset line and others.

Although an intelligent hard disk drive includes an integral controller, most computers also include another controller disposed between the system bus and the bus extending to the hard disk drive for directing communications with the hard disk drive. In one embodiment depicted in FIG. 1, this controller is mounted upon the motherboard 10 so as to be in communication with both the system bus and the hard disk drive 12. For example, a portion of the bus that extends to the hard disk drive may extend from the controller to a connector 14 that is also mounted upon the motherboard. This bus may be completed by an appropriate cable 16 having connectors on the opposed ends for connection, at a first end, with the connector mounted upon the motherboard and, at the other end, to a connector carried by the hard disk drive. As such, communication between the hard disk drive, the central processing unit and other components of the computer system is supported by the transfer of signals between the controller onboard the motherboard and the hard disk drive.

In other configurations such as that depicted in FIG. 2, the controller is not mounted upon the motherboard 10, but is, instead, mounted upon a separate printed circuit board, termed the host controller board 18, designed to connect, typically by means of an edge connector, with one of the bus slots so as to communicate with the system bus. The host controller board includes the controller as well as related electronics. As described above in conjunction with the configuration in which the controller is mounted upon the motherboard, a portion of the bus that extends to the hard disk drive is also carried by this additional board and extends from the controller to a connector 20 mounted upon the host controller board. Again, a cable 16 having appropriate connectors on the opposed ends is mated at one end to the connector carried by the host controller board and, at the other end, to a connector carried by the hard disk drive 12 in order to establish communications therebetween. In either configuration in which the controller is mounted upon the motherboard or the host controller board, the controller and its associated electronics are typically termed the host and are designed to communicate directly with the hard disk drive as shown schematically in FIG. 3.

Of the intelligent hard disk drives, SCSI hard disk drives and FC hard disk drives are designed and specified to be hot swappable. In this regard, SCSI and FC hard disk drives may be removed, inserted and/or exchanged while the computer is operating and power is supplied to the various peripherals, including other disk drives. In contrast, IDE hard disk drives have not traditionally been hot swappable. Instead, IDE hard disk drives have historically only been able to be removed, inserted or otherwise exchanged while the computer was shut down or powered off. In addition, SCSI and FC hard disk drives are designed to provide various status signals indicative of, among other things, the operational state of the hard disk drive to the host. Unfortunately, IDE hard disk drives do not include provisions for transmitting similar status signals to the host.

For various reasons, SCSI hard disk drives are typically utilized by mid-range and high-end computers and FC hard disk drives are used nearly exclusively in high-end computers. In contrast, IDE hard disk drives are not generally included in higher-end systems. Even though IDE hard disk drives are traditionally utilized in low-end systems, it would still be advantageous for the IDE hard disk drives to be hot swappable and to be capable of providing status or other signals to the host.

SUMMARY OF THE INVENTION

Embodiments of the present invention permit communication of information relating to a disk drive through a bus in use between the disk drive and a host adapter. A gateway is provided between the disk drive and the bus and communicates the information relating to the disk drive to the host. The information being communicated can be information sent from the host to the gateway to control the disk drive in some way such as to shut off power to the drive or reset the drive. Information being communicated can also be information sent from the gateway to the host to indicate information about the drive, such as whether the drive has been removed from the system or a new drive has been installed.

A reset bit of a status control register of the host adapter is set to send a reset signal over the bus, and the reset signal is received at the gateway between the disk drive and the bus. In response to receiving the reset signal over the bus, the disk drive is isolated from the bus at the gateway to interconnect a shadow register of the gateway with the bus. An address is provided for the shadow register that is an address of a register of the disk drive that is isolated from the bus. The host adapter and the gateway then communicate through the bus by utilizing the shadow register after isolating the disk drive from the bus. By using an existing address for the shadow register, a new address does not need to be defined and the host adapter can communicate with the shadow register without being modified to recognize a new address.

To initiate the communication of information related to the disk drive, the host detects that a communication should occur, such as by detecting a failed disk drive. The host asserts a reset to isolate the disk drive from the bus and to interconnect the shadow register with the bus. The host then communicates information relating to the disk drive with the shadow register, such as by reading from and/or writing to the shadow register.

BRIEF DESCRIPTION OF THE DRAWINGS

Figure 1:
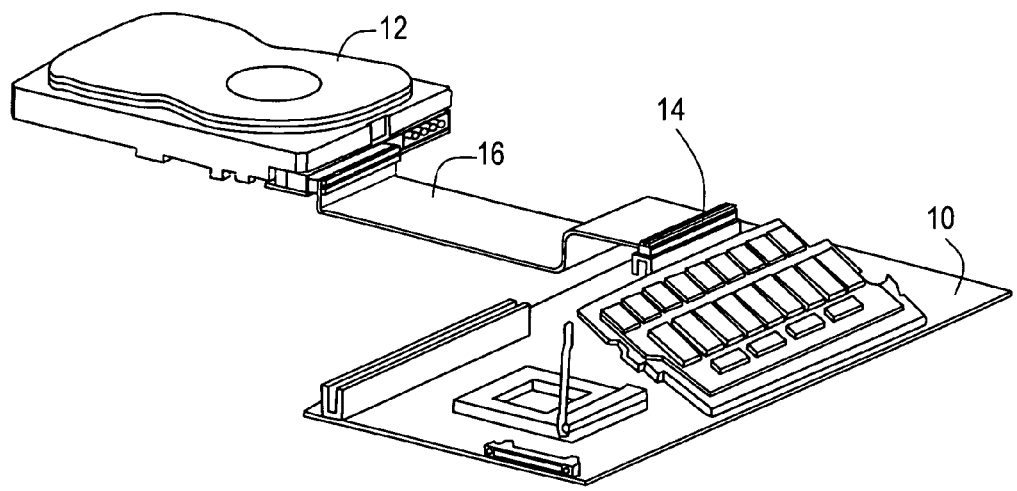
Figure 2:
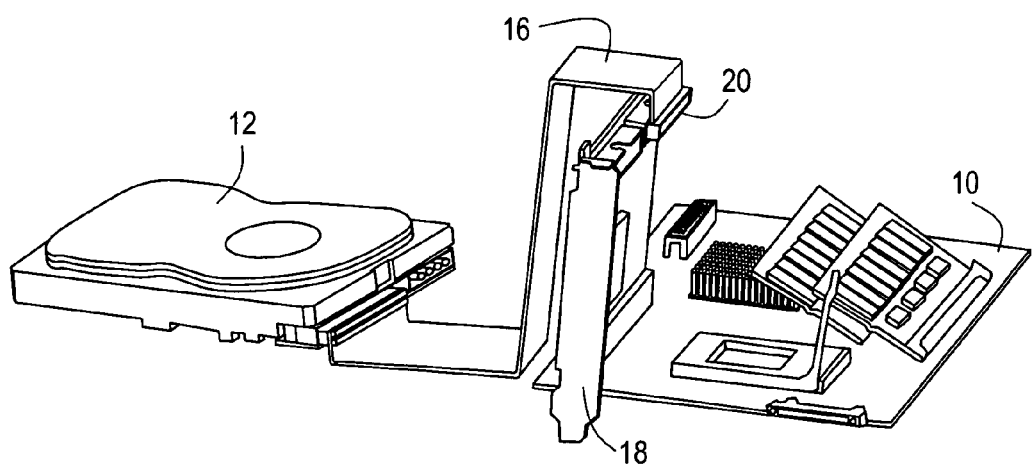
Figure 3:
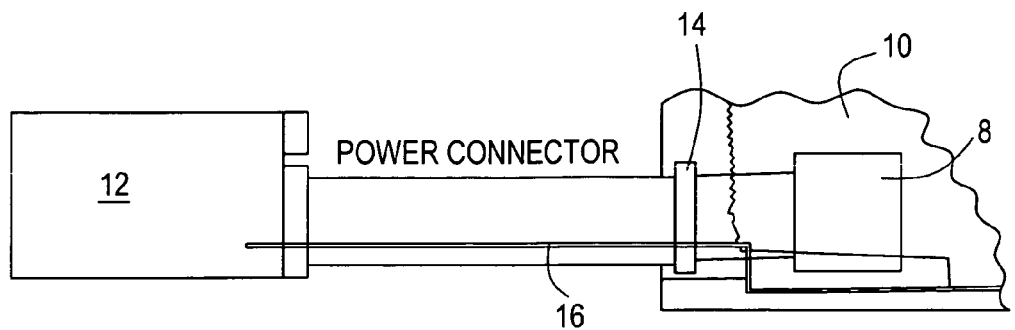
Figure 4:
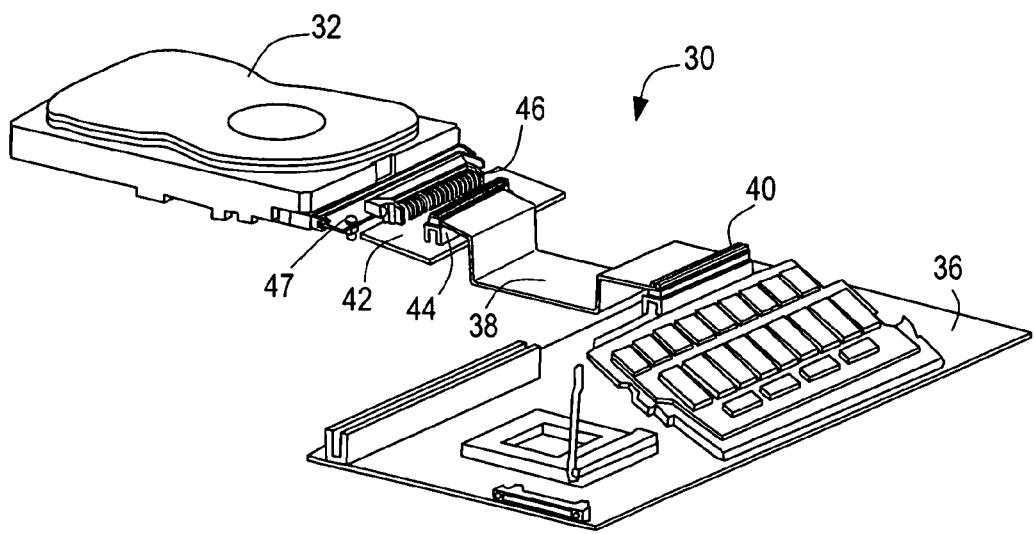
Figure 5:
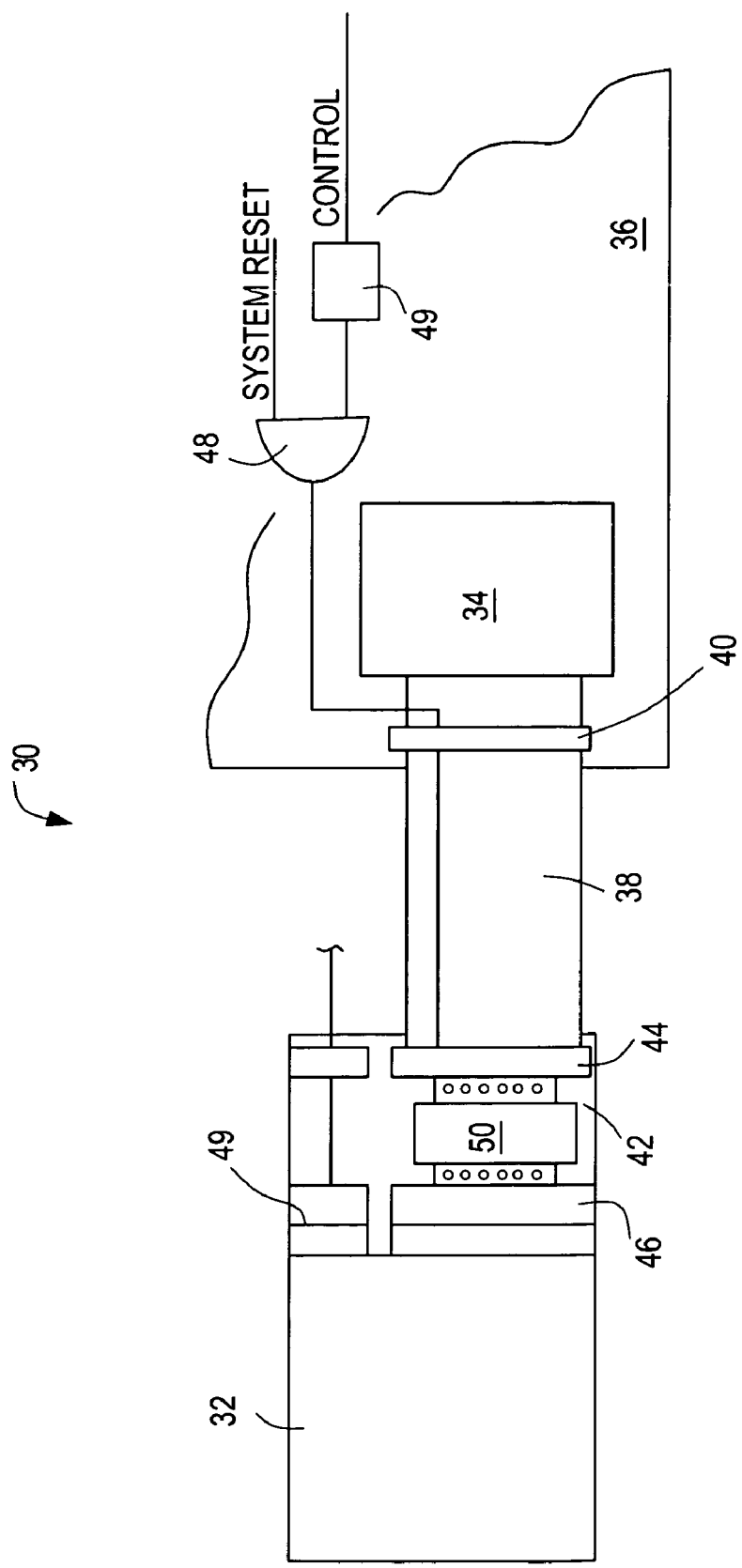
Figure 6:
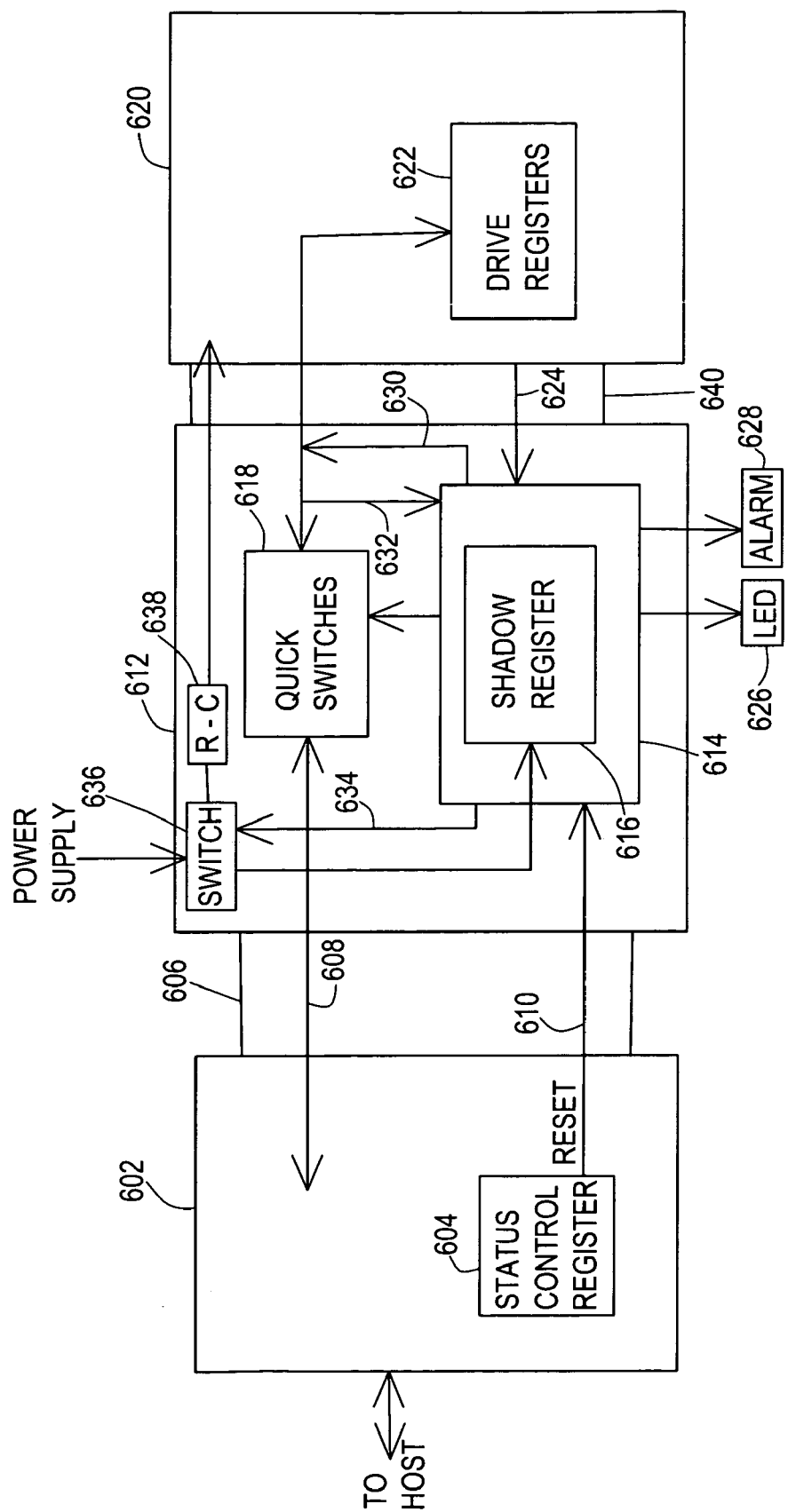
Figure 7:
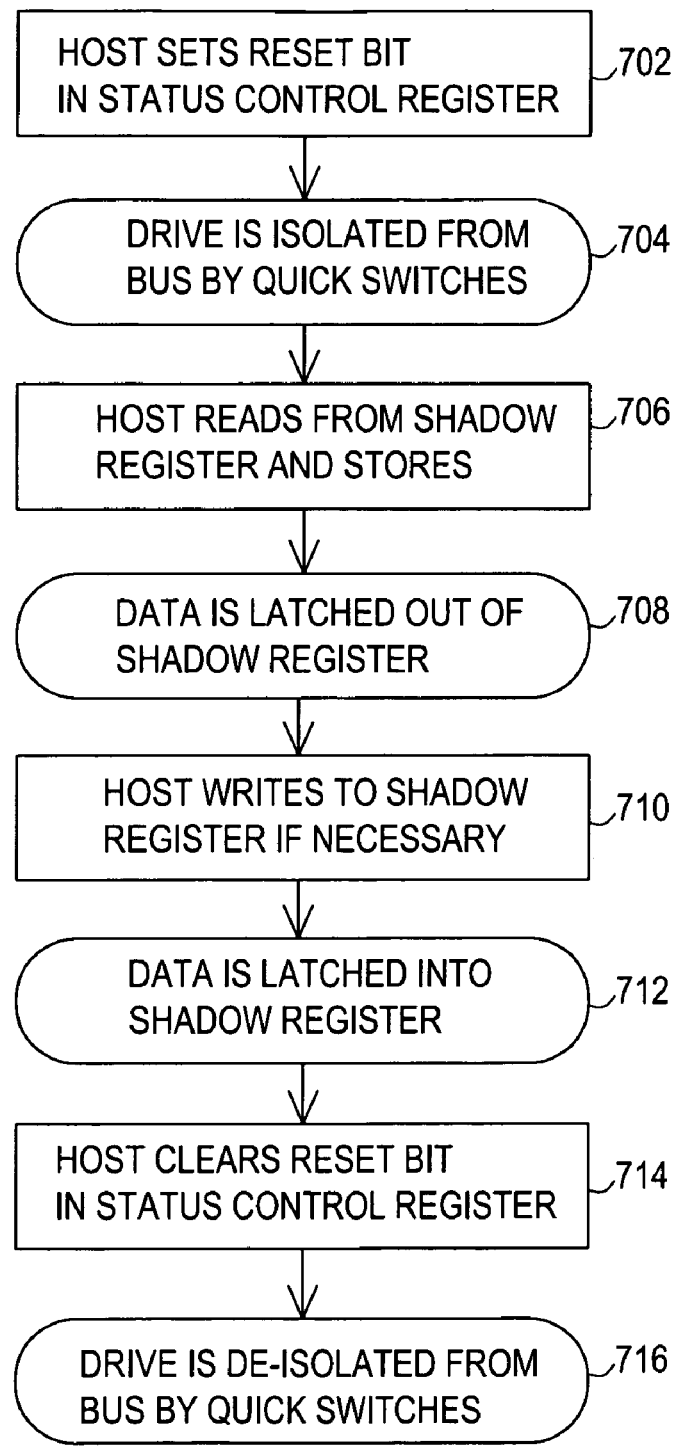
Figure 8:
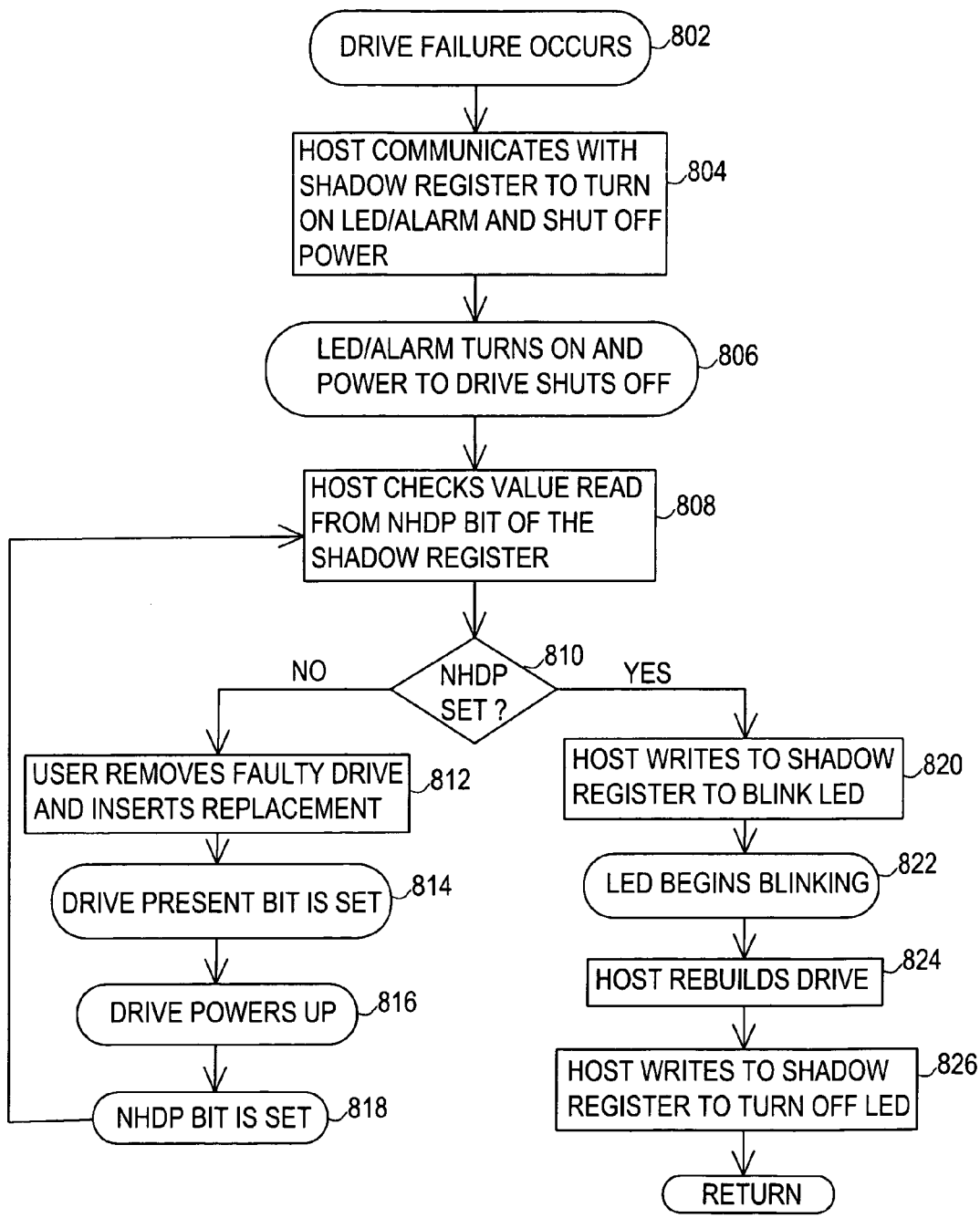
Figure 9:
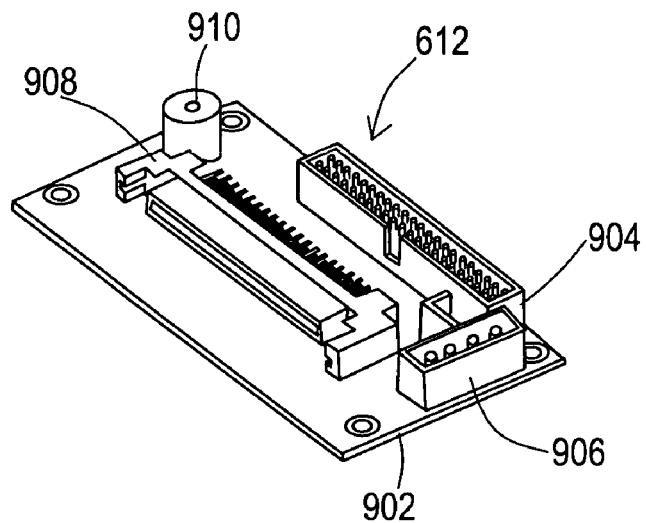
Figure 10:
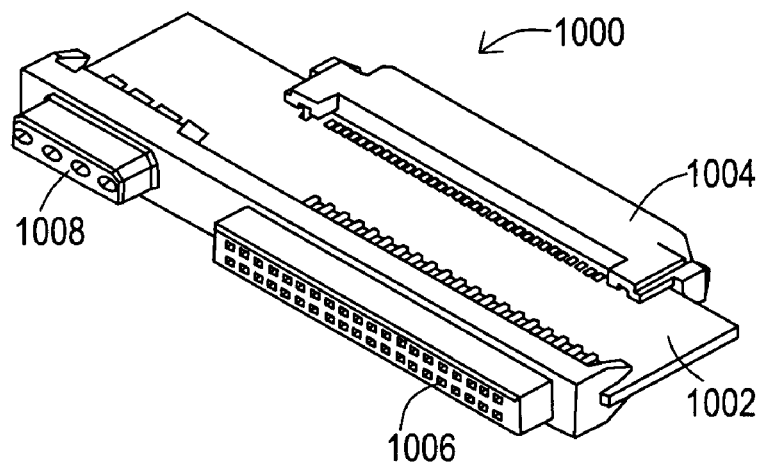
Figure 11:
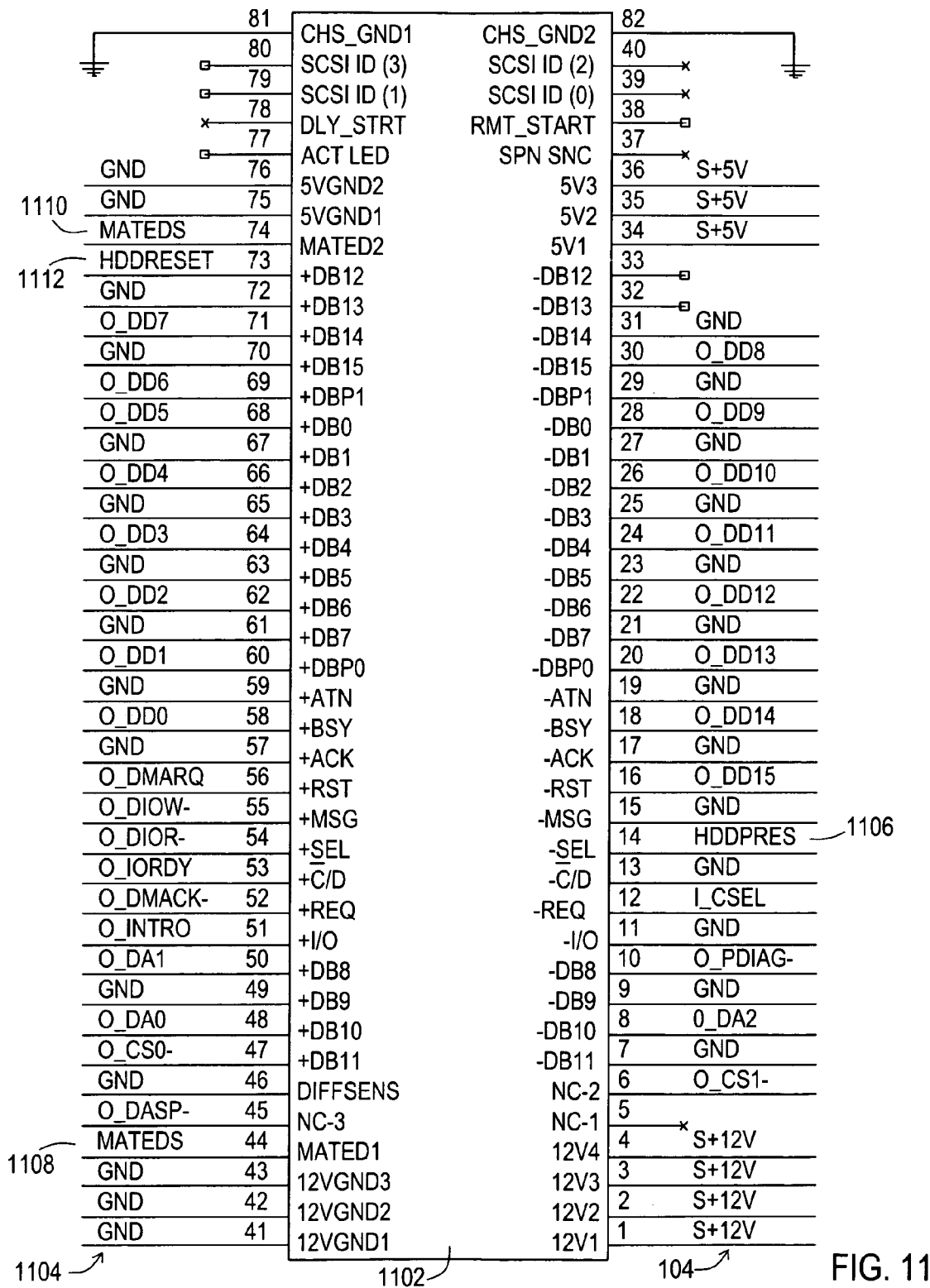

Having thus described the invention in general terms, reference will now be made to the accompanying drawings, which are not necessarily drawn to scale, and wherein:

FIG. 1 is a perspective view of a conventional motherboard and an associated IDE hard disk drive;

FIG. 2 is a perspective view of a conventional motherboard, a host controller board and an associated IDE hard disk drive;

FIG. 3 is a schematic representation of the conventional computer systems depicted in FIGS. 1 and 2;

FIG. 4 is a perspective view of an apparatus provided according to one embodiment of the present invention;

FIG. 5 is a schematic representation of the apparatus of FIG. 4 illustrating the electrical connection thereof;

FIG. 6 is a diagram illustrating an example of connections and communication between the host adapter, gateway, and disk drive through registers;

FIG. 7 shows an example of the logical operations and resulting events that occur in suspending communication with the disk drive and initiating communication with the gateway through a shadow register;

FIG. 8 shows an example of the logical operations and resulting events that occur when a disk drive is hot-swapped using a gateway between a bus and the disk drive;

FIG. 9 shows an illustrative gateway provided according to one embodiment that includes a backplane with an IDE connector and an SCA-2 connector that facilitate hot-swapping;

FIG. 10 shows an illustrative bus adapter with an IDE connector and an SCA-2 connector that works in conjunction with the gateway of FIG. 9 to facilitate hot-swapping; and FIG. 11 shows a pin-out configuration for passing IDE signals through a SCA-2 connection between a gateway backplane and bus adapter that interconnect an IDE bus and an IDE disk drive in one embodiment of the invention.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIGS. 4 and 5, an apparatus 30 according to one embodiment of the present invention is depicted. Typically, the apparatus is embodied by a personal computer. It should be understood, however, that the apparatus may also be embodied in a wide variety of other computer systems.

The apparatus 30 includes a host for communicating with a hard disk drive 32. The host generally includes a controller 34 for directing communications with the hard disk drive. As shown in FIG. 4, the controller may be mounted upon a motherboard 36 such that the entire motherboard is referred to as the host. In this embodiment, the controller is typically connected to a central processing unit onboard the motherboard via a system bus. Alternatively, the controller may be mounted upon a separate printed circuit board, i.e., a host controller board that, in turn, is electrically and physically connected to the motherboard. In this regard, the motherboard may include an expansion or bus slot and the host controller board may include an edge connector for mating with the expansion slot. As a result of its mating engagement with the expansion slot, the controller is again connected to the system bus and, in turn, the central processing unit of the motherboard for communication therewith. In this embodiment, the host controller board including the controller and the associated electronics is typically termed the host controller. Throughout this application, however, both embodiments will be generically referenced as the host.

The type of controller 34 utilized by the apparatus 30 of the present invention will generally be selected based upon the type of hard disk drive 32. For an IDE hard disk drive, for example, the controller is typically an IDE controller, such as the MegaRAID i4 IDE RAID controller provided by LSI Logic Corporation of Milpitas, Calif. The apparatus 30 of the present invention also includes a bus 38 extending from the host toward the hard disk drive 32. As shown in FIG. 4, the bus generally includes a cable having a plurality of lines and connectors mounted upon the opposed ends. The connector mounted upon one end of the cable electrically and mechanically engages a corresponding connector 40 mounted upon either the motherboard 36 or the host controller board depending upon the configuration of the host. In addition to the cable, the bus may include a bus segment that extends between the controller 34 and the connector to which the cable is mated. In this regard, the bus segment generally extends along either the motherboard or the host controller board depending upon the configuration of the host. Thus, the controller is connected to and may direct communications via the bus.

Like the controller 34, the apparatus 30 may include various types of buses 38 depending upon the type of hard disk drive 32. For an IDE hard disk drive, for example, the apparatus includes an AT bus. As known to those skilled in the art, an AT bus includes 40 lines, each of which is assigned to carry a predetermined type of signal. For example, the AT bus includes a number of address lines, a number of data lines, several chip select lines, a reset line and others. While the AT bus may be physically embodied in various manners, the AT bus is typically a flat computer cable having appropriate connectors mounted upon the opposed ends and mated at one end with the connector 40 mounted upon the motherboard 36 or the host controller board depending upon the configuration of the host so as to establish communications with the controller.

Unlike conventional IDE hard disk drives, however, the other end of the AT bus 38 of this embodiment of the present invention is not directly connected to the hard disk drive 32. Instead, the apparatus 30 of the present invention also includes an intermediate communications gateway 42. The intermediate communications gateway is disposed between the bus and the hard disk drive. Although the intermediate communications gateway may be embodied in a number of different manners, the intermediate communications gateway of one embodiment includes a backplane having a first connector 44 for mating with the connector carried by the second end of the bus. The backplane also includes a second connector 46 for establishing electrical connection with the hard disk drive. The intermediate communications gateway can establish electrical connection with the hard disk drive in a wide variety of manners including direct connection to the connector carried by the hard disk drive, connection to the hard disk drive via an adapter 47 as shown in FIG. 4 or via another cable or bus, if so desired. In any event, the intermediate communications gateway is designed to communicate with the host via the bus and to separately or locally communicate with the hard disk drive.

In normal operation, the host transmits instructions via the bus 38 so as to read data from the hard disk drive 32 or write data to the hard disk drive. With respect to a read operation, the controller 34 transmits an instruction via the bus to the intermediate communications gateway 42 indicating that data is to be read and defining the location of or otherwise identifying the data to be read. The intermediate communications gateway relays this instruction to the hard disk drive which, in turn, responds by providing the requested data to the intermediate communications gateway for transmission to the host via the bus. Conversely, in order to write data to the hard disk drive, the controller transmits an instruction indicating that data is to be written to the hard disk drive along with the actual data to be written. The intermediate communications gateway receives the instruction as well as the data to be written and relays the instruction along with the data to the hard disk drive which, in turn, appropriately stores the data.

According to the present invention, however, communication via the bus 38 with the hard disk drive 32 as described above may be suspended in order to transfer data via the bus relating to the hard disk drive. As such, the method and apparatus 30 of the present invention define two different states of communication between the host and the intermediate communications gateway 42, namely, a normal state in which data is transmitted between the hard disk drive and the host as described above and an isolation state in which communication with the hard disk drive is suspended and the hard disk drive is isolated from the bus. In order to define the state of communication between the host and the intermediate communications gateway, the host can control the state of at least one control line of the bus such that communication with the hard disk drive is supported while the control line is in a first state and communication with the hard disk drive is suspended while the control line is in a second state. While various lines of the bus may be utilized as the control line depending upon the type of hard disk drive and, correspondingly, the predefined functions of the various lines of the bus, the control line is preferably a line of the bus that may be accessed and controlled by the host.

With respect to one embodiment of the present invention in which the hard disk drive 32 is an IDE hard disk drive and the bus 38 is correspondingly an AT bus, the reset line is preferably utilized as the control line for purposes of defining the state of communication between the host and the hard disk drive since the reset line is driven by the system reset signal provided by the host, while the remainder of the lines of the AT bus originate with the controller 34 and would therefore be more difficult to access. Typically, the reset line of the AT bus is utilized by the host in order to reset the hard disk drive, such as during the initial application of power or during or following a failure, a hang or a time out condition.

Various techniques may be utilized in order to access and drive the reset line to define and control the state of communications between the host and the IDE hard disk drive 32. In one embodiment provided by means of example but not of limitation, the system reset signal is no longer directly connected to the reset line of the AT bus 38. Instead, the system reset signal is combined with a control signal generated by General Purpose Input/Output (GPIO) pins, often available from the chipset or a PCI-bridge, that defines the state of communications between the host and the hard disk drive. In the illustrated embodiment, for example, the control signal and the system reset signal are combined by an AND gate 48, with the output of the AND gate driving the reset line of the AT bus. While the relative states of the system reset line may vary based upon the signaling convention of the computer, the system reset signal is typically maintained high since the system reset signal is high under normal conditions in which the hard disk drive is not to be reset and low only in instances in which the hard disk drive is to be reset. Thus, in normal conditions in which the system reset signal is high the state of the control line will dictate the output of the AND gate 48. In this regard, while the first and second states of the control line, i.e., the reset line, may also be defined differently depending upon the signaling convention utilized by the computer, the host of one embodiment drives the control line and, in turn, the reset line high in order to maintain normal communications between the host and the hard disk drive and low in order to suspend communications with the hard disk drive and to isolate the hard disk drive from the bus. While one embodiment of a technique for controlling the reset line of the AT bus is depicted in FIG. 5, other techniques may be utilized without departing from the spirit and scope of the present invention.

The intermediate communications gateway 42 includes a logic circuit for monitoring the state of the control line and, in the above-described embodiment, permits communication between the host and the hard disk drive 32 while the control line is high, but isolates the hard disk drive from the bus 38 while the control line is low. In this regard, while the control line is high, the intermediate communications gateway transfers instructions and data received via the bus from the host to the hard disk drive and, conversely, transfers data received from the hard disk drive to the host via the bus. Upon detecting that the control line has transitioned from the first state to the second state, such as by detecting a high to low transition in the above-described embodiment, however, the intermediate communications gateway prevents the host from communicating with the hard disk drive by isolating the hard disk drive from the bus. However, the intermediate communications gateway does still support local communications between the intermediate communications gateway and the hard disk drive while the hard disk drive is isolated from the bus. In addition, the intermediate communications gateway continues to provide power received from the computer power supply to the hard disk drive while the hard disk drive is isolated from the bus.

While the hard disk drive 32 is isolated from the bus 38, the host and the intermediate communications gateway 42 can communicate data relating to the hard disk drive via the bus. The host and the intermediate communications gateway communicate a wide variety of data. This data may be transmitted via any line of the bus other than the line(s) utilized for control. Typically, however, the chip select, address and data lines of the bus are utilized for the transmission of data relating to the hard disk drive between the host and the intermediate communications gateway.

By way of one example of the type of data relating to the hard disk drive that may be communicated between the host and the intermediate communications gateway, the host may provide control signals to the intermediate communications gateway directing some activity on the part of the hard disk drive. In this example, the intermediate communications gateway receives the control signals from the host and, in turn, provides appropriate instructions to the hard disk drive via the local communications link maintained therebetween. While the host can transmit various types of control signals, examples of the control signals include power control signals for enabling the power to the drive, alarm signals for indicating a drive failure and visual indicator signals directing the hard disk drive to provide visual indicators indicating failure, presence and/or activity.

In addition to the transmission of control signals from the host to the intermediate communications gateway, the intermediate communications gateway can provide status signals to the host while the hard disk drive is isolated from the bus. Typically, the status signals are provided in response to a query from the host regarding the status of the hard disk drive. In this regard, the status signals can include the drive present signal indicating the presence or absence of a hard disk drive, a failure signal indicating if the hard disk drive has experienced a failure, an audible alarm signal indicating if the hard disk drive has a failure by sound, a visual indicator status signal indicating if the hard disk drive is currently providing a visual indication of either failure or activity, a temperature signal indicating the temperature of the air surrounding the drive, and an operational state signal indicating the current operational state of the hard disk drive.

While the intermediate communications gateway 42 may be configured in a number of different manners, the intermediate communications gateway typically includes a plurality of registers for storing status information relating to the hard disk drive 32. The status information includes, among other status conditions, the drive presence status, the failure status, the alarm status, the visual indicator status, the temperature status and the operational state status. As such, in response to a query from the host, the intermediate communications gateway 42 may provide the requested status by polling the contents of the appropriate register and transmitting the contents of the appropriate register to the host via the bus. Additionally, the intermediate communications gateway can include registers for storing the control signals received from the host. As such, the intermediate communications gateway 42 can subsequently provide appropriate instructions to the hard disk drive in accordance with the control signals transmitted by the host based upon the contents of the registers of the intermediate communications gateway.

Regardless of the particular manner of implementation, the method and apparatus 30 of the present invention permit the host to issue various commands to the hard disk drive 32 and to obtain a variety of status information relating to the hard disk drive while the computer, as a whole, remains operational and powered on and in a manner not previously possible, particularly for IDE hard disk drives.

Upon completion of the communication relating to the hard disk drive 32 between the host and the intermediate communications gateway 42, the host can again transition the state of the control line from the second state, such as the low state, to the first state, such as a high state, in order to cause the reset line of the AT bus to also transition to the low state, thereby permitting normal communications between the host and the hard disk drive to recommence as described above. This process can be repeated as many times and at whatever frequency is desired in order to permit the host to provide appropriate control signals to the immediate communications gateway and, in turn, to the hard disk drive and to permit the host to obtain the necessary status information relating to the hard disk drive.

Even in embodiments in which the reset line of the bus 38, such as the AT bus, is utilized as the control line, the method and apparatus 30 of the present invention still support resetting of the hard disk drive 32. Since the reset line is utilized to define and control the state of communications between the host and the intermediate communications gateway 42, however, the host can take advantage of the state of communications between the host and the intermediate communications gateway in the event that the system reset is asserted, such as by being driven low. In this regard, the assertion of the system reset signal will also drive the output of the AND gate 48 and, in turn, the reset line of the AT bus low, thereby isolating the hard disk drive from the bus. While the hard disk drive is isolated from the bus, the host can issue a control signal via the other lines of the bus indicating that the hard disk drive is to be reset. Upon receipt of the control signal from the host indicating that the hard disk drive is to be reset, the intermediate communications gateway can transmit an appropriate reset signal to the hard disk drive via the local communications link maintained between the intermediate communications gateway and the hard disk drive, thereby resetting the hard disk drive.

Therefore, the methods and apparatus 30 of the present invention permit data relating to a hard disk drive 32, such as an IDE hard disk drive, to be transferred via the bus 38 while the computer remains operational and powered up. For example, control signals can be directed from the host to an intermediate communications gateway 42 associated with the hard disk drive for subsequent transfer to the hard disk drive and, conversely, status signals associated with the hard disk drive can be obtained by the host from the intermediate communications gateway. As a result, the host can better control and utilize the hard disk drive. Moreover, the capabilities afforded by the methods and apparatus of the present invention permit a hard disk drive, such as an IDE hard disk drive, that is generally utilized in lower-end computers to enjoy some of the additional features traditionally only provided by the hard disk drives in higher-end computers, such as SCSI and FC hard disk drives.

As discussed above, communication between a host adapter and the gateway may be established through register-based communications, such as when the disk drive, bus, and host adapter operate with the IDE protocol. As shown in FIG. 6, the host adapter 602 of the host computer includes a status control register 604. In the IDE protocol, the status control register has a hexadecimal memory address of ECD1. The status control register has a reset bit that may be set to provide the reset signal discussed above over the bus 606, such as the IDE/ATA data bus.

The gateway 612 of this embodiment includes a programmable logic device 614 that provides a shadow register 616. The shadow register 616 is provided with an address that is the same address as a register of the disk drive 620. When operating with the IDE protocol, the address for the shadow register 616 may be the fundamental register address ECF6 for the master or ECFE for the slave of the primary channel for the host adapter 602. Alternatively, the register 616 may have fundamental register address ECF2 or ECEE for the master or slave, respectively, for the secondary channel. Thus, the host adapter 602 can communicate signals 608 to the device 614 using a register address normally used to communicate with the disk drive 620 over the bus 606 without defining a new address and adapting the host adapter 602 to use the new address. The disk drive 620 has registers 622 that are used to communicate signals 608 through the bus 606 with the host adapter 602 when the disk drive 620 is not isolated from the bus 606 by a set of quick switches 618.

The quick switches 618 are controlled by the processing device 614 in response to receiving a reset signal 610 from the host adapter 602. For normal communication with the disk drive 620, the reset signal 610 is not present so the device 614 causes the switches 618 to pass the signals 608 to the drive registers 622. Upon the host deciding to communicate with the gateway 612 through the bus 606, the reset signal 610 is provided and the quick switches 618 isolate the disk drive 620 from the bus 608. Communication signals 608 are then routed between the bus 606 and the shadow register 616 of the device 614.

The shadow register 616 of this embodiment is eight bits wide. Two bits are used to control an LED 626 that signals when a drive has failed or when the drive is being rebuilt. Other LEDs may also be controlled by the device 614 such as to indicate disk drive activity. The LED 626 turns on when the disk drive has failed and blinks during rebuilding of the drive. Rebuilding is useful where multiple drives for one system are mirrored to provide redundancy, such as in a level one redundant array of independent disks ("RAID").

Rebuilding a drive involves loading the mirror image of another drive onto the drive being rebuilt to establish the redundancy. Rebuilding occurs when a drive has failed and data must be re-loaded onto a replacement drive that is installed in place of the failed drive. The replacement drive may be installed without powering down the system, and the hot-swapping of a new drive in place of a failed drive is discussed in more detail below with reference to FIGS. 8 and 9.

The shadow register 616 also has a third bit that is used to activate an alarm 628, such as an audible alert, to indicate that the drive has failed. Typically, the host detects a drive failure when the drive does not respond after a particular number of accesses by the host. When the host detects a drive failure, it sets the third bit to provide the alarm.

A fourth bit of the register 616 is used to switch power on and off to the disk drive. This fourth bit is used during startup by the host to control the sequential application of power to the disk drives to prevent an array of disks from receiving power simultaneously at start-up. Powering the disk drives of an array simultaneously at startup risks disrupting other system components because the power supply of the computer system becomes briefly overwhelmed to start-up the drives and creates a power deficiency for the system.

To control the powering up of drives, either at startup or during a hot-swap, the processing device 614 communicates with switches 636, such as multiple field effect transistors ("FETs") through control signals 634. The switches 636 receive power from the system power supply and pass voltage to the disk drive 620 on command from the logic device 614. In this embodiment, power is supplied through a resistor-capacitor ("RC") filter network 638, as known in the art, to ramp up power to the disk drive 620 and reduce the impact of the power drain during initial application of power to the drive 620. The behavior of the switches 636 and filter network 638 is discussed in more detail below with reference to FIG. 9 in relation to hot-swapping.

The shadow register 616 also has a fifth bit to signal to the gateway 612 from the host that the disk drive 620 should be reset, as opposed to utilizing the ordinary reset signal which is now used to trigger communication with the shadow register 616. The logic device 614 outputs a signal 630 to the reset line of a bus attachment 640. The bus attachment 640 transfers the reset signal to the disk drive 620 to reset the disk drive 620 upon request from the host. An illustrative bus attachment 640 that facilitates hot-swapping is discussed in more detail below with reference to FIGS. 9–10.

The shadow register 616 has a sixth bit that is used to signal to the host, such as the host adapter or operating system driver of the host computer, that a new hard disk drive is present in the system. For example, when a drive has failed and has been hot-swapped, or replaced without the system being powered down, this new hard drive present ("NHDP") bit signals to the host that a new drive is now present and should be rebuilt. The logic device 614 of the gateway 612 monitors the bus attachment 640 as shown in FIGS. 9 and 10 to determine when the pins for the disk drive 620 have mated with the pins for the gateway 612.

When the logic device 614 detects that the disk drive is no longer present because it has been removed after failure and then detects that the pins of the bus attachment 640 have later mated through signal 632, then the sixth bit of the shadow register 616 is set to indicate to the host that a new drive has been installed. The signal 632 may be delayed for several clock cycles to eliminate a value bouncing problem during the mating of the pins in the bus attachment 640. The host does not need to employ logic to detect the removal and then replacement of the disk drive 620 but must only determine if this sixth bit is set in the shadow register 616 to know that a rebuild should occur. This process is discussed in more detail below in relation to hot-swapping with reference to FIG. 8.

When the logic device 614 detects that the pins of bus attachment 640 are mated or are not mated at anytime during operation through signal 632, it sets a seventh bit in the shadow register 616 that indicates to the host that a disk drive is or is not present for the bus 606. The host may use this seventh bit for various reasons, such as to determine whether to disable power to the bus attachment 640 by interaction with the shadow register 616 or to enable power to the bus attachment 640 through a power up sequence for the disk drive 620 once it has been installed. As discussed above, the signal 632 may be delayed several clock cycles to prevent a value bouncing problem during mating of the pins.

In this embodiment, a switch (not shown) may be provided in a chassis where the drive is mounted to see if a carrier for the drive is installed. Typically, for a hot-swap configuration, the drive will reside in a removable carrier that fits within the chassis. The carrier of the disk drive 620 is detected through a signal 624 from the switch in the chassis. The shadow register 616 has an eighth bit that conveys the presence of the carrier to the host. Thus, the host can recognize when a carrier is present and also detect whether a drive is present within the carrier as described above in regards to monitoring pin contact within the bus attachment 640.

An example of the logical operations and events that occur when the host wishes to suspend communication with the disk drive 620 in order to communicate with the gateway 612 are shown in FIG. 7. The logical operations begin at reset operation 702 where the host sets the reset bit in the status control register 604. The host sets the reset bit when it wishes to communicate with the gateway 612 at regular polling intervals specified for the host or once a particular event such as a drive failure has been detected by the host. The host may be the host adapter 604 when the host adapter 604 has built-in logic for performing these logical operations, such as for a RAID adapter. Alternatively, host as used herein may refer to a device driver of an operating system of the host computer or an application program running on the host computer that causes the central processing unit ("CPU") of the host computer to issues commands through the system bus to the host adapter.

When the host sets the reset bit, the reset signal is provided to the logic device 614 of the gateway 612 which causes the logic device 614 to trigger the quick switches 618 and interconnect the shadow register 616 with the bus 606. Thus, as shown at isolation event 704, the disk drive 620 becomes isolated from the bus 606 by the quick switches 618. Then, at read operation 706, the host reads from the shadow register 616 any values it contains. For example, the host may read from the shadow register 616 to determine whether a new drive has been installed and whether a disk drive is present. The host reads and stores the values read from the shadow register 706 prior to writing any values so that the values previously in the shadow register 706 are not overwritten and lost. The read operation 706 results in the latch event 708 where the data is latched out of the shadow register 616.

Once the data has been latched out, the host writes any values to the shadow register if necessary at write operation 710. For example, the host may have previously detected that the drive has failed so the host writes to the shadow register to clear the first bit and set the second bit to turn on the LED 626 that indicates a failure. Additionally, the host may write to the shadow register 616 to set the third bit to turn on or off an alarm 628, the fourth bit to turn on or off the power through the bus attachment 640, or the fifth bit to reset the disk drive 620. Data is latched into the shadow register 616 at latch event 712 which results from the write operation 710. When the host has completed writing operation 710, the host clears the reset bit of the status control register 604 at clear operation 714. The disk drive 620 is de-isolated from the bus 606 by activation of the quick switches 618 at de-isolation event 716 and then normal communication between the disk drive 620 and host adapter 602 may continue. Once de-isolated, the disk drive register having the same address as the shadow register 616 may be utilized by the host.

FIG. 8 shows the logical operations and resulting events for hot-swapping a disk drive 620 to replace a failed drive. Hot-swapping involves installing a disk drive without powering down the computer system. In the example shown, a hard drive of a RAID system fails and a replacement is installed without shutting down the power to the computer system by hot-swapping the replacement drive in place of the failed drive. Alternatively, a failed drive may only need rebuilding and can be removed and then re-installed to initiate the rebuilding process. However, one skilled in the art will recognize that hot-swapping may be performed in other contexts as well, such as where a drive is being hot-swapped to provide additional rather than redundant storage.

At failure event 802, a disk drive 620 fails to respond to the host causing the host to detect that the disk drive 620 has failed. The host as discussed with reference to FIG. 8 includes a host adapter, device driver of an operating system, and/or an application program. Typically, the host detects the failure by attempting a read or write to the disk drive three times without receiving a response. At communication operation 802, the host begins communicating with the gateway 612 by suspending communication with the disk drive 620 through asserting the reset signal to the gateway 612 as shown in FIG. 7. The gateway 612 then interconnects the shadow register 616 to allow the host to write instructions to the gateway 612 over the IDE bus 606.

During communication operation 802, the host sets the LED bits of the shadow register 616 to cause the LED 626 to turn on. Additionally, the host may set the alarm bit to cause the alarm 628 to sound. Also at this point, the host may set the power bit to cause the gateway 612 to turn off power to the disk drive 620. Alternatively, the logic device 614 may automatically set the power bit of the shadow register 616 to indicate a power down condition and then remove power from the disk drive 620 upon receiving the command to turn on the LED 626. At gateway event 806, the LED 626 turns on and power is cut off through operation of the switches 636.

The host reads the NHDP bit of the shadow register 616 at read operation 808. Then at query operation 810, the host detects whether the NHDP bit was set to indicate a new drive is present or is cleared to indicate that a new drive is not present. On at least the first iteration, the NHDP bit will be cleared because a new drive will not yet have been installed. The user removes the faulty drive and inserts a replacement drive, or reinserts the faulty drive, at user operation 812. The mated event 814 occurs as a result, where the logic device 614 receives the signal from MATED pins of the bus attachment 640 thereby indicating that a drive 620 has been installed. MATED pins are discussed in more detail below with reference to FIG. 11.

In response to the MATED pins indicating a drive is installed, the logic device 614 provides power to the drive 620 by turning on the switches 636 to gradually ramp up the power through the filter 638. The drive powers up at power event 816. Alternatively, the host reads from the shadow register 616 that the hard disk present bit indicates that a drive 620 is installed, and then sets the power bit in the shadow register 616 to cause the logic device 614 to power up the drive 620.

Additionally, the logic device 614 detects that the MATED pins have shown that a drive was not installed and now that a drive 620 is installed, so the logic device 614 sets the NHDP bit to indicate that a new drive 620 is present at bit event 818. The host checks again for the NHDP bit at read operation 808 after the NHDP bit has been set. Query operation 810 then detects that the NHDP bit is set, and the host then writes to the shadow register 616 to blink the LED 626 to indicate a rebuild at write operation 820. The LED 626 begins to blink at LED event 822.

After de-isolating the drive 620 from the bus 606 by de-asserting the reset signal 610, the host rebuilds the drive 620 at rebuild operation 824. Once the drive 620 has been rebuilt, the host again asserts the reset 610 to isolate the drive 620, and then writes to the shadow register 616 to turn off the LED 626 at write operation 826. Thereafter, the drive 620 is de-isolated and normal operations between the host and the disk drive 620 begin.

For other contexts such as where additional storage will result from the hot-swap, the host may periodically poll to determine whether a new drive 620 has appeared as specified by the NHDP bit. At that point, the host can direct the gateway 612 to power up the drive if not automatically done by the logic device 614 and then de-isolate the drive 620 from the bus 606. The host may then configure the new drive 620 as necessary, such as by partitioning and formatting the drive 620 as well as registering the drive within the operating system.

FIG. 9 shows an illustrative circuit board backplane 902 of the gateway 612 of FIG. 6 (or gateway 42 of FIG. 4). The circuit board 902 facilitates hot-swapping and/or suspension of communication with the disk drive 620 by providing circuitry, such as the simplified circuitry shown in FIG. 6. The circuit board 902 in this example includes a first connector 904 (connector 44 of FIG. 4) that mates to the bus 606 leading to the host adapter 602. As shown, the gateway 612 operates with an IDE host adapter and IDE disk drive, so the connector 904 is an IDE connector that mates to an IDE bus 606 leading to the IDE host adapter 602.

The circuit board 902 also includes a second connector 908 (connector 46 of FIG. 4) that forms a first portion of the bus attachment 640 discussed above. The second connector 908 of this example is an SCA-2 connector that provides an easily connectable/disconnectable junction between the gateway 612 and a bus adapter discussed below with reference to FIG. 10. The SCA2 connector 908 is designed to slidably receive a card edge type SCA-2 connector mate. The SCA-2 type of connector is ordinarily used with versions of SCSI hard disk drives which are hot-swappable by design, instead of IDE drives that are ordinarily not hot swappable. The SCA-2 connector 908 provides pins of a pre-set length so that a predictable sequence of pin connection occurs when the connector 908 is mated. For example, ground and power are mated prior to other connections to prevent unknown states of other pins from causing an unpredictable result upon initial contact. One skilled in the art will recognize that other connector types may also be used. Alternative connectors that provide a sufficient number of pins to at least carry the IDE signals and that provide a pre-set sequence of pin connection are also applicable.

The circuit board 902 of this embodiment includes a standard power connector 906 for connecting to a power supply of a computer system. As discussed above, power may be routed through the gateway 612 to the disk drive 620. The power provided to the third connector 906 is routed to the second connector 908 when power is to be supplied to the disk drive 620. Additionally, this embodiment includes a buzzer 910 for providing an audible alarm to the user such as when the disk drive has failed.

FIG. 10 shows an illustrative bus adapter 1000 (adapter 47 of FIG. 4) that forms the second part of the bus attachment 640 discussed above. The bus adapter 1000 includes a circuit board 1002 that passes electrical signals between the pins of a first connector 1004 and a second connector 1006. The circuit board 1002 may also transfer power from the first connector 1004 to a third connector 1008. As shown, the first connector 1004 is a card edge type SCA-2 connector that mates with the SCA-2 connector 908 of the circuit board 902. The first connector 1004 passes the IDE signals, the gateway signals such as the hard drive reset signal 630 and hard drive/carrier presence signals 624 and 632, and the power to the disk drive 620.

The IDE signals and gateway signals are passed between the SCA-2 connector 1004 and the second connector 1006 which is an IDE connector in this embodiment intended for use with an IDE disk drive 620. The connector 106 may be inserted into the IDE connector of the disk drive 620, or alternatively may be connected to the IDE connector of the drive 620 via an IDE ribbon cable. Therefore, signals may be exchanged between the gateway 612 and the disk drive 620 by passing signals between the connector 908 of the gateway 612 and the connector 1004 of the bus adapter 1000.

The third connector 1008 of the bus adapter 1000 is a standard power connector that mates to the power connector of a disk drive 620. As shown, the bus adapter 1000 may be designed so that the power connector 1008 directly connects to the power connector of the disk drive 620 when the IDE connector 1006 directly connects to the IDE connector of the disk drive 620. The power connector 1008 provides power to the disk drive 620 that passes from the system power supply through the gateway 612 and to the adapter 1000.

During hot-swapping, the gateway 612 of FIG. 9 remains attached to the IDE bus 606 at connector 904 and remains connected to the power supply at connector 906. Likewise, the adapter 1000 of FIG. 10 remains attached to the drive 620 at IDE connector 1006 and power connector 1008. Connector 908 of the gateway 612 and connector 1004 of the adapter 1000 engage or disengage when installing or removing a drive 620. When a drive is replaced, the adapter 1000 may be removed from the old drive and installed on the new drive prior to inserting the new drive.

FIG. 11 illustrates the pin assignments of the SCA-2 connectors 908 and 1004 for carrying IDE signals, gateway signals, and power to the drive. The pin assignments normally used for SCSI drives are illustrated within the pin layout 1102. An example of corresponding pin assignments being used in the bus attachment 640 are shown in layout 1104. One skilled in the art will recognize that the pin assignments shown in layout 1104 are merely for illustrative purposes and that many variations are possible. As shown by the layout 1104, certain ground pins, +12 Volt pins, and +5 Volt pins for the SCA-2 connector establish contact prior to other pins including the IDE and gateway signal pins.

For example, the MATEDS pins 1108 and 1110 establish contact subsequent to the initial contact and provide the signal 632 to the logic device 614 of the gateway 612 so that the shadow register bit may be set to indicate that a disk drive is or is not present. Typically, the logic device 614 provides a voltage on the MATEDS pins 1108 and 1110 that transitions to a logic low once mated due to grounding of the MATEDS pins 1108 and 1110 at the disk drive. The MATEDS pins 1108 and 1110 are provided at opposite ends of the pin layout 1104 so that when both pins 1108 and 1110 are mated, it is certain that the connector 1004 has completely seated within the connector 908.

The HDDPRES pin 1106 establishes contact subsequent to the intial contact and provides the signal 624 that indicates to the logic device 614 that the disk drive carrier has been installed in the chassis. The HDDRESET pin 1112 also establishes contact subsequent to the initial contact and provides the reset signal 630 from the logic device 614 that resets the disk drive 620 when the host writes to the appropriate bit of the shadow register 616. The remaining pins of the layout 1104 correspond to the +12 Volt and +5 Volt power, and ground as well as the IDE signals 608 as are known in the art. However, the reset signal 610 provided by the host is not transferred to the disk drive 620 through a pin of layout 1104 but is instead intercepted at the logic device 614. Additional unused pins of layout 1102 are left unconnected for layout 1104 as shown in FIG. 11.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of communicating information relating to a disk drive through a bus in use between the disk drive and a host adapter, comprising:
   receiving a reset signal at a gateway between the disk drive and the bus, the reset signal sent from the host adapter as a result of a reset bit of a status control register of the host adapter being set;
   in response to receiving the reset signal over the bus, isolating the disk drive from the bus at the gateway to interconnect a shadow register of the gateway with the bus, wherein the disk drive is electrically connected to the gateway while isolated from the bus, and wherein an address of the shadow register is an address of a register of the disk drive that is isolated from the bus; and
   communicating between the host adapter and the gateway through the bus by utilizing the shadow register after isolating the disk drive from the bus, wherein communicating between the host adapter and the gateway comprises receiving control signals at the gateway directing at least one activity of the disk drive.

2. The method of claim 1, wherein data is latched out of at least one position of the shadow register prior to latching data into the shadow register from the host adapter.

3. The method of claim 1, wherein communicating between the host adapter and the gateway comprises reading from the shadow register to determine whether the disk drive is present.

4. The method of claim 1, wherein communicating between the host adapter and the gateway comprises writing a bit to the shadow register to cause the gateway to reset the disk drive.

5. The method of claim 1, wherein communicating between the host adapter and the gateway comprises writing a bit to the shadow register to cause the gateway to enable power to the disk drive.

6. The method of claim 1, further comprising:
   after communicating between the host adapter and the gateway, clearing the reset bit of the status control register; and
   in response to clearing the reset bit, de-isolating the disk drive from the bus.

7. The method of claim 1, wherein a host computer utilizing the host adapter and disk drive runs an application program, and wherein setting the reset bit occurs in response to a command from the application program.

8. The method of claim 1, wherein a host computer utilizing the host adapter and disk drive runs an operating system that implements a driver, and wherein setting the reset bit occurs in response to a command from the driver implemented by the operating system.

9. The method of claim 1, wherein the host adapter includes RAID logic to manage an array of disk drives, and wherein setting the reset bit occurs in response to a command from RAID logic of the host adapter.

10. An apparatus for communicating information relating to a disk drive through a bus in use between the disk drive and a host adapter, comprising:
    a plurality of switches interconnecting the disk drive to the bus;
    a processing device in communication with the bus and the plurality of switches, wherein the processing device provides a shadow register having an address that is the address of a register of the disk drive and wherein the processing device is operative to:
    intercept a reset signal through the bus from the host adapter,
    trigger the plurality of switches to isolate the disk drive from the bus in response to the intercept of the reset signal;
    share information relating to the disk drive with the host adapter through interaction of the shadow register with the bus while the disk drive is isolated from the bus; and
    utilize a local communication link with the isolated disk drive to instruct the isolated disk drive to perform at least one activity in response to receiving a control signal from the host adapter.

11. The apparatus of claim 10, further comprising at least one light emitting diode, and wherein the processor is further operative to turn the light emitting diode on and off in accordance with communication from the host adapter.

12. The apparatus of claim 10, further comprising a switch for establishing a signal when the disk drive is present, wherein the switch provides the signal to the processing device.

13. The apparatus of claim 10, wherein the processing device is further operative to detect from the signal when a disk drive has been removed and then when a disk drive has been installed to alter a bit in the shadow register to indicate to the host adapter that a new disk drive is present.

14. A computer system comprising:
    a first data bus in communication with a central processing unit;
    a second data bus in communication with a disk drive;
    a host adapter that passes data between the first bus and the second bus including a reset signal in response to a command from the central processing unit;
    a gateway in communication with the second bus and the disk drive, the gateway comprising:
    a plurality of switches interconnecting the disk drive to the second bus;
    a processing device that provides a shadow register having an address that is the address of a register of the disk drive, wherein the processing device is in communication with the second bus and the plurality of switches and is configured to:
    intercept a reset signal through the second bus from the host adapter,
    in response to intercepting the reset signal, trigger the plurality of switches to communicatively isolate the disk drive from the second bus without physically disconnecting the disk drive from the computer system;
    receive a control signal from the host adapter directing at least one activity of the disk drive; and utilize a local communication link with the isolated disk drive to instruct the isolated disk drive to perform the at least one activity in response to receiving the control signal from the host adapter.

15. The computer system of claim 14, further comprising an operating system being executed by the central processing unit, wherein the operating system implements a device driver that issues a command to the host adapter through the first bus to set a reset bit of a status control register to provide the reset signal over the second bus.

16. The computer system of claim 14, further comprising an application program running within an operating system being executed by the central processing unit, wherein the application program initiates sending a command to the host adapter through the first bus to set a reset bit of a status control register to provide the reset signal over the second bus.

17. The computer system of claim 14, wherein the gateway further comprises at least one light emitting diode, and wherein the processing device is further configured to turn the light emitting diode on and off in accordance with communication from the host adapter.

18. The computer system of claim 14, wherein the gateway further comprises a switch for establishing a signal when the disk drive is present, wherein the switch provides the signal to the processing device.

19. The computer system of claim 14, wherein the processing device is further configured to detect from the signal when a disk drive has been removed and then when a disk drive has been installed to alter a bit in the shadow register to indicate to the host adapter that a new disk drive is present.

20. The computer system of claim 14, wherein the host adapter, second bus, gateway, and disk drive operate with the IDE protocol and wherein the shadow register has a hexadecimal address of ecf6 to indicate a master to the host adapter.

21. A method of communicating information relating to a disk drive through a bus in use between the disk drive and a host, comprising:
   detecting at the host that a communication of information relating to the disk drive should occur;
   asserting a reset from the host to isolate the disk drive from the bus and to interconnect a shadow register with the bus, wherein the shadow register has an address that is an address of a register of the disk drive; and
   communicating at the host information relating to the disk drive with the shadow register, wherein communicating information relating to the disk drive with the shadow register comprises providing control signals directing at least one activity of the isolated disk drive.

22. The method of claim 21, wherein detecting at the host that a communication of information relating to the disk drive should occur comprises detecting that a polling interval has occurred.

23. The method of claim 21, wherein detecting at the host that a communication of information relating to the disk drive should occur comprises detecting that the disk drive has failed.

24. The method of claim 21, wherein communicating at the host information relating to the disk drive with the shadow register comprises writing to the shadow register from the host.

25. The method of claim 21, wherein communicating at the host information relating to the disk drive with the shadow register comprises reading from the shadow register by the host.

26. The method of claim 21, wherein the host is an operating system being executed by a computer utilizing the host adapter and disk drive.

* * * * *